US009858348B1

(12) United States Patent
Higgins et al.

(10) Patent No.: US 9,858,348 B1
(45) Date of Patent: *Jan. 2, 2018

(54) SYSTEM AND METHOD FOR PRESENTATION OF MEDIA RELATED TO A CONTEXT

(71) Applicant: Google Inc., Mountain View, CA (US)

(72) Inventors: Christopher W. Higgins, Portland, OR (US); Christopher T. Paretti, Sunnyvale, CA (US); Nicola Stefano Ghezzi, Santa Monica, CA (US); Michael Spiegelman, Los Angeles, CA (US); Ronald Martinez, San Francisco, CA (US); Marc Davis, Sunnyvale, CA (US); Chris Kalaboukis, Los Gatos, CA (US)

(73) Assignee: Google Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/834,863

(22) Filed: Aug. 25, 2015

Related U.S. Application Data

(63) Continuation of application No. 13/901,938, filed on May 24, 2013, now Pat. No. 9,158,794, which is a
(Continued)

(51) Int. Cl.
*G06F 17/30* (2006.01)
*H04W 4/02* (2009.01)
(Continued)

(52) U.S. Cl.
CPC .... *G06F 17/3087* (2013.01); *G06F 17/30029* (2013.01); *G06F 17/3074* (2013.01);
(Continued)

(58) Field of Classification Search
CPC .......... G06F 17/3074; G06F 17/30749; G06F 17/30864; G06F 17/3087
See application file for complete search history.

(56) References Cited

U.S. PATENT DOCUMENTS

| 5,446,891 | A | 8/1995 | Kaplan et al. |
| 5,493,692 | A | 2/1996 | Theimer et al. |

(Continued)

FOREIGN PATENT DOCUMENTS

| EP | 1362302 | 11/2003 |
| JP | 2002312559 | 10/2002 |

(Continued)

OTHER PUBLICATIONS

"Companies add new communication features to photo sharing.", Digital Imaging Digest, Feb. 2006, pp. 1-2.
(Continued)

*Primary Examiner* — Jeong S Park
(74) *Attorney, Agent, or Firm* — Fish & Richardson P.C.

(57) ABSTRACT

A system and method for presentation of media related to a context. A request is received over a network from a requesting device for media related to a context, wherein the request comprises at least one criteria. A query is formulated based on the context criteria so as to search, via the network, for user profile data, social network data, spatial data, temporal data and topical data that is available via the network and relates to the context and to media files so as to identify at least one media file that is relevant to the context criteria. A playlist is assembled via the network containing a reference to the media files. The media files on the playlist are transmitted over the network to the requesting device.

13 Claims, 10 Drawing Sheets

Related U.S. Application Data continuation of application No. 12/163,314, filed on Jun. 27, 2008, now Pat. No. 8,452,855.

(51) Int. Cl.
  *H04W 4/18* (2009.01)
  *H04L 29/06* (2006.01)
  *H04L 29/08* (2006.01)

(52) U.S. Cl.
  CPC .. *G06F 17/30106* (2013.01); *G06F 17/30867* (2013.01); *H04L 65/403* (2013.01); *H04L 65/60* (2013.01); *H04L 67/06* (2013.01); *H04W 4/02* (2013.01); *H04W 4/18* (2013.01); *G06F 17/30864* (2013.01)

(56) References Cited

U.S. PATENT DOCUMENTS

| | | |
|---|---|---|
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,630,972 B2 | 12/2009 | Ott et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolarz et al. |
| 7,831,586 B2 | 11/2010 | Reitter et al. |
| 7,853,881 B1 | 12/2010 | Aly Assal et al. |
| 7,865,308 B2 | 1/2011 | Athsani |
| 7,925,708 B2 | 4/2011 | Davis |
| 8,024,223 B2 | 9/2011 | Cradick et al. |
| 8,024,317 B2 | 9/2011 | Nair et al. |
| 8,032,508 B2 | 10/2011 | Martinez et al. |
| 8,055,675 B2 | 11/2011 | Higgins et al. |
| 8,060,492 B2 | 11/2011 | Nair et al. |
| 8,069,142 B2 | 11/2011 | Davis et al. |
| 8,086,700 B2 | 12/2011 | Davis et al. |
| 8,108,778 B2 | 1/2012 | Athsani et al. |
| 8,150,967 B2 | 4/2012 | King et al. |
| 8,166,016 B2 | 4/2012 | Higgins et al. |
| 8,166,168 B2 | 4/2012 | Hayashi et al. |
| 8,271,506 B2 | 9/2012 | Martinez et al. |
| 8,281,027 B2 | 10/2012 | Martinez et al. |
| 8,307,029 B2 | 11/2012 | Davis et al. |
| 8,364,611 B2 | 1/2013 | Tendjoukian et al. |
| 8,386,506 B2 | 2/2013 | Martinez et al. |
| 8,402,356 B2 | 3/2013 | Martinez et al. |
| 8,452,855 B2 * | 5/2013 | Higgins .............. H04W 4/02 455/3.04 |
| 8,538,811 B2 | 9/2013 | Higgins et al. |
| 8,554,623 B2 | 10/2013 | Higgins et al. |
| 8,560,390 B2 | 10/2013 | Higgins et al. |
| 8,583,668 B2 | 11/2013 | Higgins et al. |
| 8,589,486 B2 | 11/2013 | Martinez et al. |

(56) References Cited

U.S. PATENT DOCUMENTS

| | | |
|---|---|---|
| 8,594,702 B2 | 11/2013 | Naaman et al. |
| 8,671,154 B2 | 3/2014 | Davis et al. |
| 8,706,406 B2 | 4/2014 | Kalaboukis et al. |
| 8,745,133 B2 | 6/2014 | Martinez et al. |
| 8,762,285 B2 | 6/2014 | Davis et al. |
| 8,769,099 B2 | 7/2014 | Kalaboukis et al. |
| 8,799,371 B2 | 8/2014 | Davis et al. |
| 8,813,107 B2 | 8/2014 | Higgins et al. |
| 8,914,342 B2 | 12/2014 | Kalaboukis et al. |
| 9,158,794 B2 * | 10/2015 | Higgins .................. H04W 4/02 |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abaijian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0138839 A1 * | 9/2002 | Nihal .................. G06Q 30/0601 725/60 |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Ameerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallabh et al. |
| 2006/0258368 A1 | 11/2006 | Granite et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |

(56) References Cited

U.S. PATENT DOCUMENTS

| | | |
|---|---|---|
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0189333 A1 | 8/2007 | Naaman et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005071 A1* | 1/2008 | Flake .................. G06F 17/3087 |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0103971 A1 | 5/2008 | Lukose et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114737 A1* | 5/2008 | Neely .................. G06Q 10/107 |
| 2008/0114751 A1 | 5/2008 | Cramer et al. |
| 2008/0117201 A1 | 5/2008 | Martinez et al. |
| 2008/0120178 A1 | 5/2008 | Martinez et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0126960 A1 | 5/2008 | Naaman et al. |
| 2008/0133593 A1* | 6/2008 | Clark .................. G06F 17/30749 |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0201310 A1 | 8/2008 | Fitzpatrick et al. |
| 2008/0268772 A1* | 10/2008 | Linnamaki ............. H04H 20/38 455/3.04 |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gadd |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0024452 A1 | 1/2009 | Martinez et al. |
| 2009/0043844 A1 | 2/2009 | Zimmet et al. |
| 2009/0044132 A1 | 2/2009 | Cambel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1 | 3/2009 | Jhanji |
| 2009/0089296 A1 | 4/2009 | Stemeseder et al. |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0150501 A1 | 6/2009 | Davis et al. |
| 2009/0150507 A1 | 6/2009 | Davis et al. |
| 2009/0165022 A1 | 6/2009 | Madsen et al. |
| 2009/0165051 A1 | 6/2009 | Armaly |
| 2009/0171939 A1 | 7/2009 | Athsani et al. |
| 2009/0176509 A1 | 7/2009 | Davis et al. |
| 2009/0177603 A1 | 7/2009 | Honisch |
| 2009/0177644 A1 | 7/2009 | Martinez et al. |
| 2009/0182618 A1 | 7/2009 | Higgins et al. |
| 2009/0182631 A1 | 7/2009 | Higgins et al. |
| 2009/0182810 A1 | 7/2009 | Higgins et al. |
| 2009/0183112 A1 | 7/2009 | Higgins et al. |
| 2009/0187637 A1 | 7/2009 | Wu et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0216606 A1 | 8/2009 | Coffman et al. |
| 2009/0222302 A1 | 9/2009 | Higgins |
| 2009/0222303 A1 | 9/2009 | Higgins |
| 2009/0222551 A1 | 9/2009 | Neely et al. |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1 | 10/2009 | Janie et al. |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0027527 A1 | 2/2010 | Higgins et al. |
| 2010/0063993 A1 | 3/2010 | Higgins et al. |
| 2010/0070368 A1 | 3/2010 | Choi et al. |
| 2010/0082403 A1 | 4/2010 | Higgins et al. |
| 2010/0082427 A1 | 4/2010 | Burgener et al. |
| 2010/0082688 A1 | 4/2010 | Davis et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0138491 A1 | 6/2010 | Churchill et al. |
| 2010/0185509 A1 | 7/2010 | Higgins et al. |
| 2010/0185517 A1 | 7/2010 | Higgins et al. |
| 2010/0185518 A1 | 7/2010 | Higgins et al. |
| 2010/0185642 A1 | 7/2010 | Higgins et al. |
| 2010/0228582 A1 | 9/2010 | King et al. |
| 2010/0241689 A1 | 9/2010 | Davis et al. |
| 2010/0241944 A1 | 9/2010 | Athsani et al. |
| 2010/0280879 A1 | 11/2010 | O'Sullivan et al. |

(56) References Cited

U.S. PATENT DOCUMENTS

| | | | |
|---|---|---|---|
| 2010/0280913 | A1 | 11/2010 | O'Sullivan et al. |
| 2011/0035265 | A1 | 2/2011 | King et al. |
| 2011/0040691 | A1 | 2/2011 | Martinez et al. |

FOREIGN PATENT DOCUMENTS

| | | |
|---|---|---|
| KR | 1020000036897 | 7/2000 |
| KR | 1020000054319 | 9/2000 |
| KR | 1020000064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | 2006/116196 | 11/2006 |
| WO | 2007/022137 | 2/2007 |
| WO | 2007/027453 | 3/2007 |
| WO | 2007070358 | 6/2007 |
| WO | 2007113546 | 10/2007 |

OTHER PUBLICATIONS

"Dave.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content. (Profile)", Screen Digest, No. 420, p. 305, Sep. 2006, (pp. 1-9 of attached).

"Digital rights management: a primer: developing a user-friendly means of protecting content.(Profile)", Screen Digest, No. 420, p. 305, Sep. 2006, (pp. 1-9 of attached).

"Emerging Markets: What media 2.0 can offer advertisers.", Campaign, Oct. 27, 2006, p. 26, (pp. 1-5 of attached).

"Gutenkarte" Book Catalog, 2006 MetaCarta, Inc., www.gutenkarte.org 11 pgs.

"Reality Digital—Making Media Move", www.realitydigital.com, Nov. 28, 2006, pp. 1-2.

"Reality Digital Debuts Opus", www.lightreading.com. Sep. 25, 2006, pp. 1.

"Semacode-URL Barcodes-practical ubiquitous computing", located at http://semacode.org visited on Apr. 13, 2007; 3 pages.

"Technical White Paper: Choosing the best 2D barcode format for mobile apps, "Semacode, Jul. 15, 2006; pp. 1-7 located at http://semacode.org/abouUtechnical/whitepaper/best2_d_code.pdf.

Allen James F., "Maintaining Knowledge About Temporal Intervals", Communications of the ACM, Nov. 1983, vol. 26, No. 11 pp. 832-843; 12 pages.

Almieda, R.B. et al. "A Community-Aware Search Engine," WWW2004, New York., NY, May 17-22, 2004, pp. 413-421.

Anonymous. (2007). "Ask.com Maps & Directions," located at <http://maps.ask.com/maps>, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com>, last visited on Mar. 3, 2008, one page.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," Jul. 3, 2006, located at <http://earth.google.com/userguide/v4/ug_imageoverlays.html >, 9 pages.

Anonymous. (Date Unknown). "Google Earth User Guide" located at <http://earth.google.com/userguide/v4/>, last visited on Feb. 27, 2008, twelve pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (Jul. 16, 2006). MyFantasyLeague Fantasy Football League Management-Features, located at <http://web.archive.org/web/20060716072900/www.myfantasyleague.eom/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529//www.fantasyfootballstarters.com/lineupAnalyzer.jsp >, last visited on Feb. 10, 2009, one page.

Axup, Jeff et al., "Conceptualizing New Mobile Devices by Observing Gossip and Social Network Formation Amongst the Extremely Mobile", ITEE Technical Report #459, Dec. 19, 2005, pp. 1-71.

Backstrom et al., Spatial Variation in Search Engine Queries, WWW•2008, Beijing, China (Apr. 21-25, 2008).

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Bharat, K. (Date Unknown). "SearchPad: Explicit Capture of Search Context to Support Web Search," located at <http://www9.org/w9cdrom/173/173.html >, last visited Aug. 1, 2007, 13 pages.

Brunato, M; Battiti R. "Pilgrim: A Location Broker and Mobility-Aware Recommendation System"; Technical report DIT-02-0092, Universita di Trento, Oct. 2002; 8 pages.

Budzik, J. et al. (2000). "User Interactions with Everyday Applications as Context for Just-in-Time Information Access," Proceeding of the 2000 Conference on Intelligent User Interfaces, eight pages.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

Cooper, M. et al. (Nov. 2-8, 2003). "Temporal Event Clustering for Digital Photo Collections," MM'03 Berkeley, California, pp. 364-373.

Davis, M. et al. "From Context to Content: Leveraging Context for Mobile Media Metadata," Proceedings of the 12th annual ACM international conference on Multimedia, Oct. 2004, pp. 188-195.

Davis, M. et al. "Mobile Media Metadata for Mobile Imaging." Jun. 27-30, 2004; 4 pages.

Davis, M. et al. "Using Context and Similarity for Face and Location Identification." In Proceedings of the IS&T/SPIE 18th Annual Symposium on Electronic Imaging Science and Technology, 2006, 10 pages.

Davis, M. et al. (Oct. 10-16, 2004). "From Context to Content: Leveraging Context to Infer Media Metadata," MM'04 New York, New York. 9 pages.

Davis, Marc et al., "From Context to Content: Leveraging Context to Infer Media Metadata", ACM Press, Oct. 10, 2004, pp. 1-8.

Davis. M. et al. (Apr. 2-7, 2005). "MMM2: Mobile Media Metadata for Media Sharing," CHI 2005 Portland, Oregon. 4 pages.

(56) References Cited

OTHER PUBLICATIONS

Finkelstein, L. et al. (2001). "Placing Search in Context: The Concept Revisited," WWW/O, Hong Kong, May 2-5, 2001, pp. 406-414.
Helm Welcome to Flickr—Photo Sharing, located at <http://www.flickr.com >visited on Feb. 26, 2007, one page.
Freyne, J. et al. (2004). "Further Experiments on Collaborative Ranking in Community-Based Web Search," Artificial Intelligence Review, pp. 1-23.
Gan et al., Analysis of Geographic Queries in a Search Engine Log, LocWeb 2008, Beijing, China (Apr. 22, 2008).
Gargi, U. (Aug. 7, 2003). "Consumer Media Capture: Time-Based Analysis and Event Clustering," Technical Report HPL-2003-165 HP Laboratories Palo Alto, pp. 1-15.
Geographical Information Science, vol. 22, No. 3, pp. 1-20 (Jul. 2008).
Go With the Flow, The Economist Technology Quarterly, vol. 382, Issue 8519, 4 pages, (Mar. 10, 2007).
Goldberger, J. et al. The Hungarian Clustering Method, located at <http://scholar.googles.com/scholar?num=20&hl=en&1r=&9=cache:vbwslsmlCisJ:www.openu.acil/Personal_sites/tarnirtassa/Publications/hcm.pdf+goldberger+clustering+method+hungarian> visited on Mar. 1, 2007, twelve pages.
Graham, A. et al, (Jul. 13-17, 2002). Time as Essence for Photo Browsing Through Personal Digital Libraries, JCDL '02 Portland, Oregon. 11 pages.
International Preliminary Report on Patentability (PCT/US2007/084807) dated May 26, 2009; 5 pages.
International Search Report (PCT/US2007/084807) dated May 27, 2008; 3 pages.
International Search Report (PCT/US2009/030405) dated Sep. 23, 2009; 2 pages.
International Search Report (PCT/US2009/055503) dated Apr. 8, 2010; 3 pages.
International Search Report (PCT/US2009/060379) dated Apr. 30, 2010; 3 pages.
International Search Report (PCT/US2010/026063) dated May 27, 2008; 3 pages.
International Search Report and Written Opinion (PCT/US2008/085135) dated May 25, 2009; 7 pages.
International Search Report and Written Opinion (PCT/US2009/046258) dated Dec. 23, 2009; 7 pages.
International Search Report and Written Opinion (PCT/US2009/060374) dated Apr. 30, 2010; 12 pages.
International Search Report and Written Opinion (PCT/US2009/060476) dated May 4, 2010; 12 pages.
International Search Report and Written Opinion PCT/US2009/034445 dated Oct. 12, 2009; 7 pages.
International Search Report PCT/US2008/088228 dated Sep. 30, 2009—2 pages.
International Search Report PCT/US2009/030406 dated Sep. 29, 2009; 5 pages.
International Search Report PCT/US2009/034444 dated Sep. 18, 2009; 2 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Jones et al., "Geographic Intention and Modification in Web Search," International Journal of Geographical Information Science, 22(3):229-246, Mar. 2008.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_projecUGroup7/ >, last visited on Feb. 2, 2010, thirteen pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lieberman, H. (1995) "Letizia: An Agent that Assists Web Browsing," Proceedings of the Fourteenth International Joint Conference on Artificial Intelligence, Aug. 20-25, 1995, six pages.
Lin, F. et al., "A unified framework for managing Web-based services.", Information Systems and e-Business Management, vol. 3, Oct. 2005, p. 299, (pp. 1-15 of attached).
Lin, F. et al., "A unified framework for managing Web-based services." Information Systems and e-Business Management, vol. 3, Oct. 2005, p. 299, (pp. 1-15 of attached).
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_projecUGroup6/index.h > . . . , last visited on Feb. 2, 2010, ten pages.
MediaFlo, FLO Technology Overview, Qualcomm Inc. Copyright 2007; 24 pages.
Metz, Cade, "MySpace Nation", PC Magazine, Jun. 21, 2006, pp. 1-10 attached.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_projecUGroup8/about.p . . . ,> last visited on Feb. 2, 2010, seventeen pages.
Mitra, M. et al. (1998). "Improving Automatic Query Expansion," Proceedings of the AMC SIGIR, nine pages.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Naaman, M. et al. (Nov. 2003). "From Where to What: Metadata Sharing for Digital Photographs with Geographic Coordinates," In on the Move to Meaningful Internet Systems 2003: Coop/S, DOA, and Odbase R. Meersman et al. eds., pp. 196-217.
Nair, R. et al. (Nov. 6-11, 2005). "Photo L01: Browsing Multi-User Photo Collections," MM'05 Singapore, pp. 223-224.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.
Notification of Transmittal of The International Search Report and the Written Opinion of the International Search Authority, or Declaration (PCT/US2007/084797) dated Mar. 21, 2008; 11 pages.
O'Hare, N. et al. "Combination of Content Analysis and Context Features for Digital Photograph Retrieval." Integration of Knowledge, Semantics and Digital Media Technology, 2005. EWIMT 2005. The 2nd European Workshop on the, pp. 323-328, Dec. 2005.
Office Action U.S. Appl. No. 12/041,054 dated Oct. 27, 2010; 15 pages.
Office Action U.S. Appl. No. 12/041,062 dated Oct. 28, 2010; 12 pages.
Office Action U.S. Appl. No. 12/041,088 dated Oct. 4, 2010; 18 pages.
Perkowitz, Mike et al., "Utilizing Online Communities to Facilitate Physical World Interactions", The International Conference on Communities and Technologies, Sep. 19, 2003, Amsterdam, pp. 16.
Pigeau, A. et al. (Jun. 17, 2005). "Organizing a Personal Image Collection with Statistical Model-Based ICL Clustering on Spatio-Temporal Camera Phone Meta-Data." 25 pages.

(56) References Cited

OTHER PUBLICATIONS

Press Release, "Qualcomm Conducts First Live Demonstration of FL Technology on a Wireless Handset", Qualcomm Inc., San Diego, Sep. 27, 2005; 3 pages.
Rekimoto, et al., "CyberCode: designing augmented reality environments with visual tags." Proceedings of DARE 2000 on Designing augmented reality environments, Elsinore, Denmark, pp. 1-11Apr. 12-14, 2000.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Roush, Wade, "Social Machines", Continuous Computing Blog, Jul. 5, 2005, pp. 1-21.
Roush, Wade, "Social Machines", Technology Review, Aug. 2005, pp. 45-51.
Sanderson et al., "Analyzing Geographic Queries," in SIGIR Workshop on Geographic Information Retrieval, 2 pages, 2004.
Sansbury, C. (Sep. 13, 2005). "Yahoo! Widget for BBC Sports News—Scotland," 32. Located at <http://widgets.yahoo.com/gallery/view.php?widget=37220 >, last visited on Feb. 7, 2007, one page.
Sarvas, R. et al. (Jun. 6-9, 2004). "Metadata Creation System for Mobile Images," MobiSys'04 Boiton, Massachusetts, pp. 36-48.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Toyama, K. et al. (Nov. 2-8, 2003). "Geographic Location Tags on Digital Images," MM '03'Berkeley: California. 12 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,486 file history dated Jul. 25, 2008; 65 pgs.
U.S. Appl. No. 12/180,499 file history dated Jul. 25, 2008; 67 pgs.
U.S. Appl. No. 11/593,668, filed Nov. 6, 2006 for Naaman, et al.
U.S. Appl. No. 11/593,869, filed Nov. 6, 2006 for Naaman, et al.
U.S. Appl. No. 12/407,681, filed Mar. 19, 2009; 56 pages.
U.S. Appl. No. 12/407,690, filed Mar. 19, 2009; 50 pages.
Voight, Joan et al., "Lessons for Today's Digital Market", Adweekcom, Oct. 2, 2006, pp. 1-6.
Wooldridge, M. et al. (2005). "STALK. The Camera-phone Scavenger Hunt!" located at <http://www.stalk.com >, last visited on Dec. 28, 2009, two pages.
Written Opinion (PCT/US2008/085915) dated Jun. 29, 2009; 4 pages.
Written Opinion (PCT/US2008/086948) dated May 21, 2009; 5 pages.
Written Opinion PCT/US2008/088228 dated Sep. 30, 2009—5 pages.
www.stalk.com (retrieved on Dec. 29, 2009) pp. 1-2.
Yahoo! Inc. (Dec. 7, 2005). "Yahoo! Widget Engine 3.0 Reference Manual Version 3.0," 300 pages.

\* cited by examiner

SYSTEM AND METHOD FOR PRESENTATION OF MEDIA RELATED TO A CONTEXT

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for selecting and presenting media on a network and, more particularly, to systems and methods for selecting and presenting media which relates to a specific topic using, in part, data collected and stored by multiple devices on a network.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method, a request is received over a network from a requesting device for media related to a context, wherein the request comprises at least one criteria. A query is formulated based on the context criteria so as to search, via the network, for user profile data, social network data, spatial data, temporal data and topical data that is available via the network and relates to the context and to media files so as to identify at least one media file that is relevant to the context criteria. A playlist is assembled via the network containing a reference to the media files. The media files on the playlist are transmitted over the network to the requesting device.

In another embodiment, the invention is a system. The system comprise: a context entry module that enables entry of a request on a requesting device for media related to a context, wherein the request contains at least one criteria; a query module that uses context criteria entered through the context entry module to formulate a query based on the context criteria so as to search, via the network, for user profile data, social network data, spatial data, temporal data and topical data that is available via the network and relates to the context and to media files so as to identify at least one media file that is relevant to the context criteria; a playlist generation module that assembles playlists containing a reference to the at least one media file; and a media delivery module that transmitting the media files on the playlist over a network to the requesting device.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
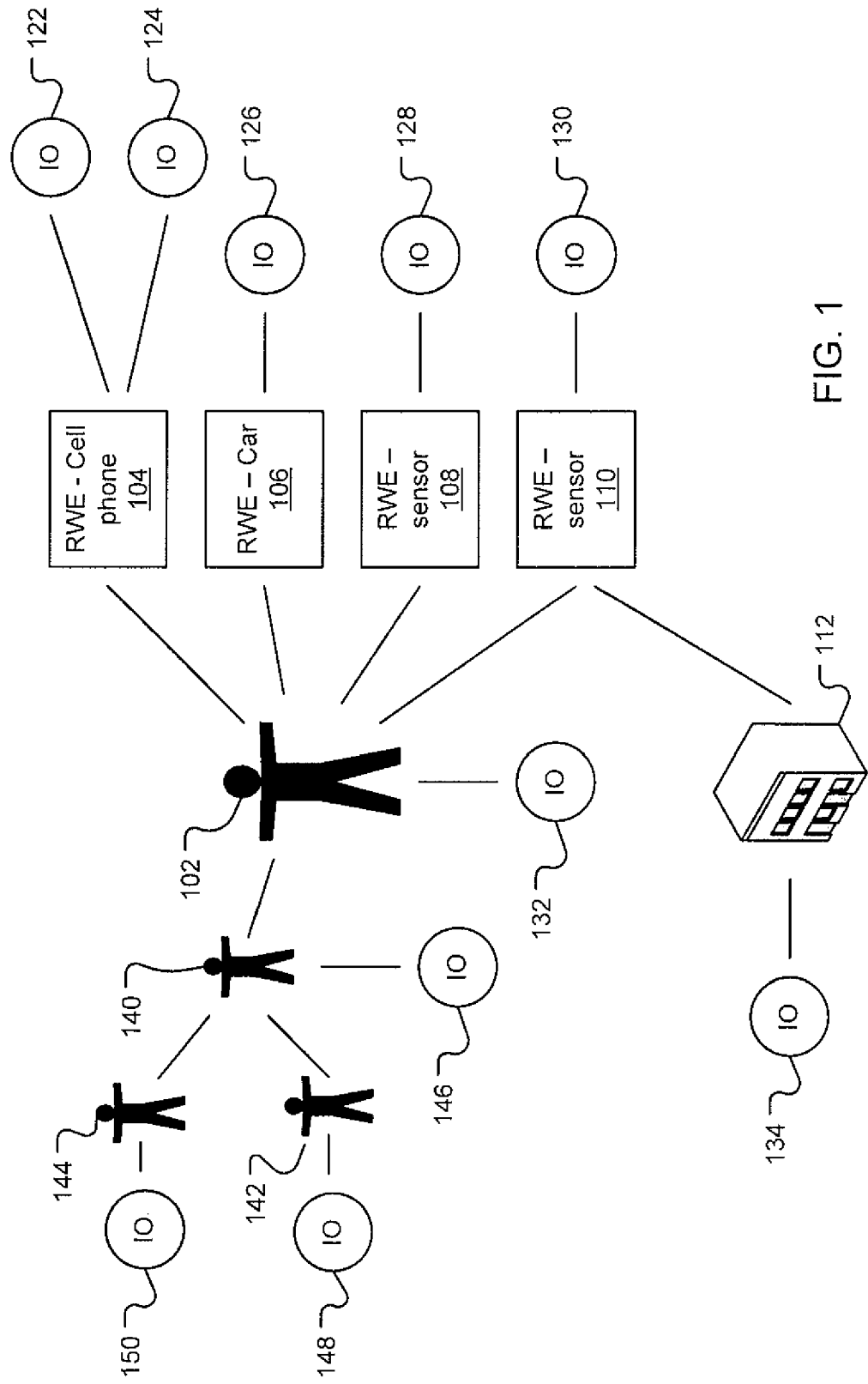
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
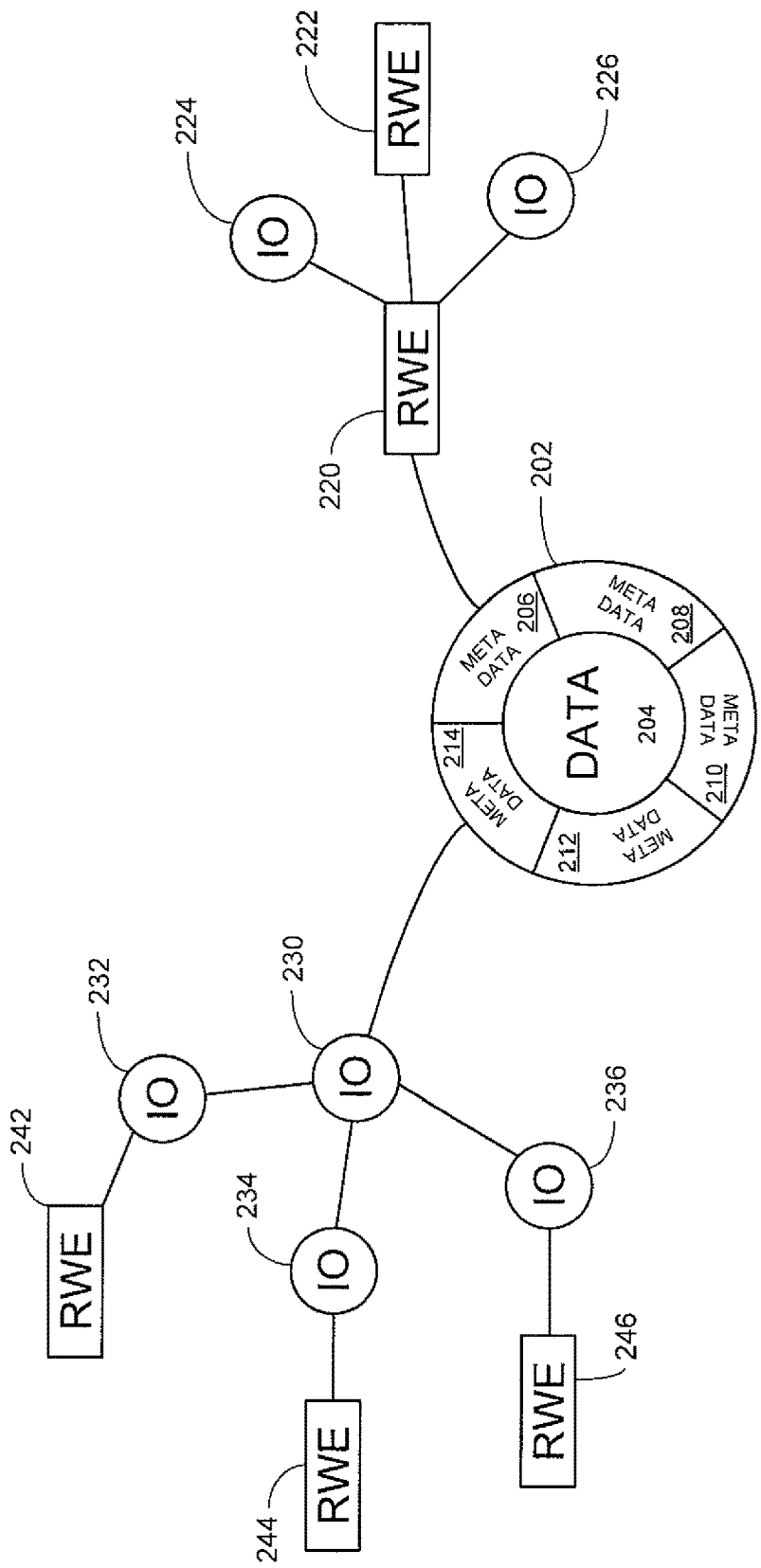
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
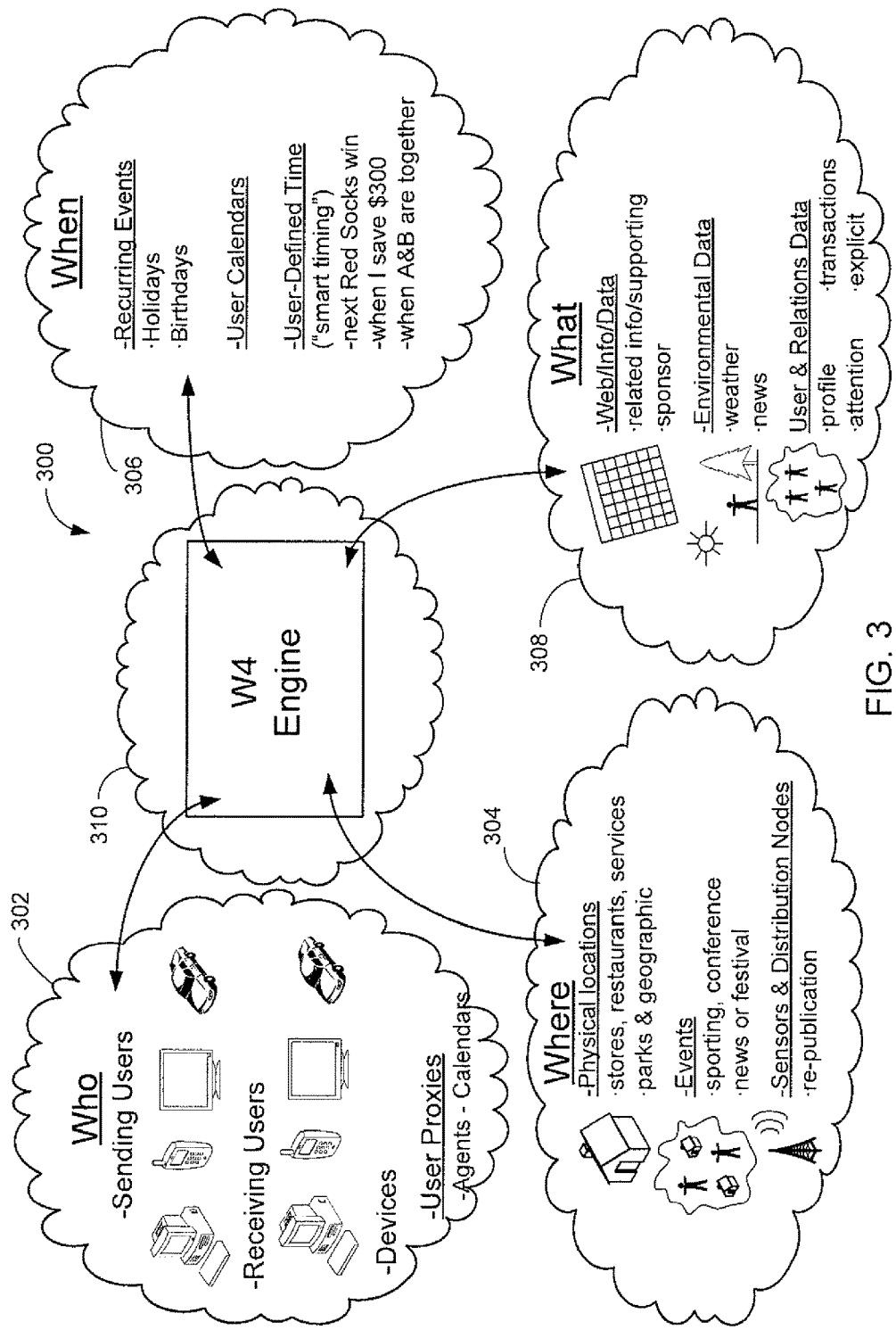
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data-web or private, commercial or user-accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
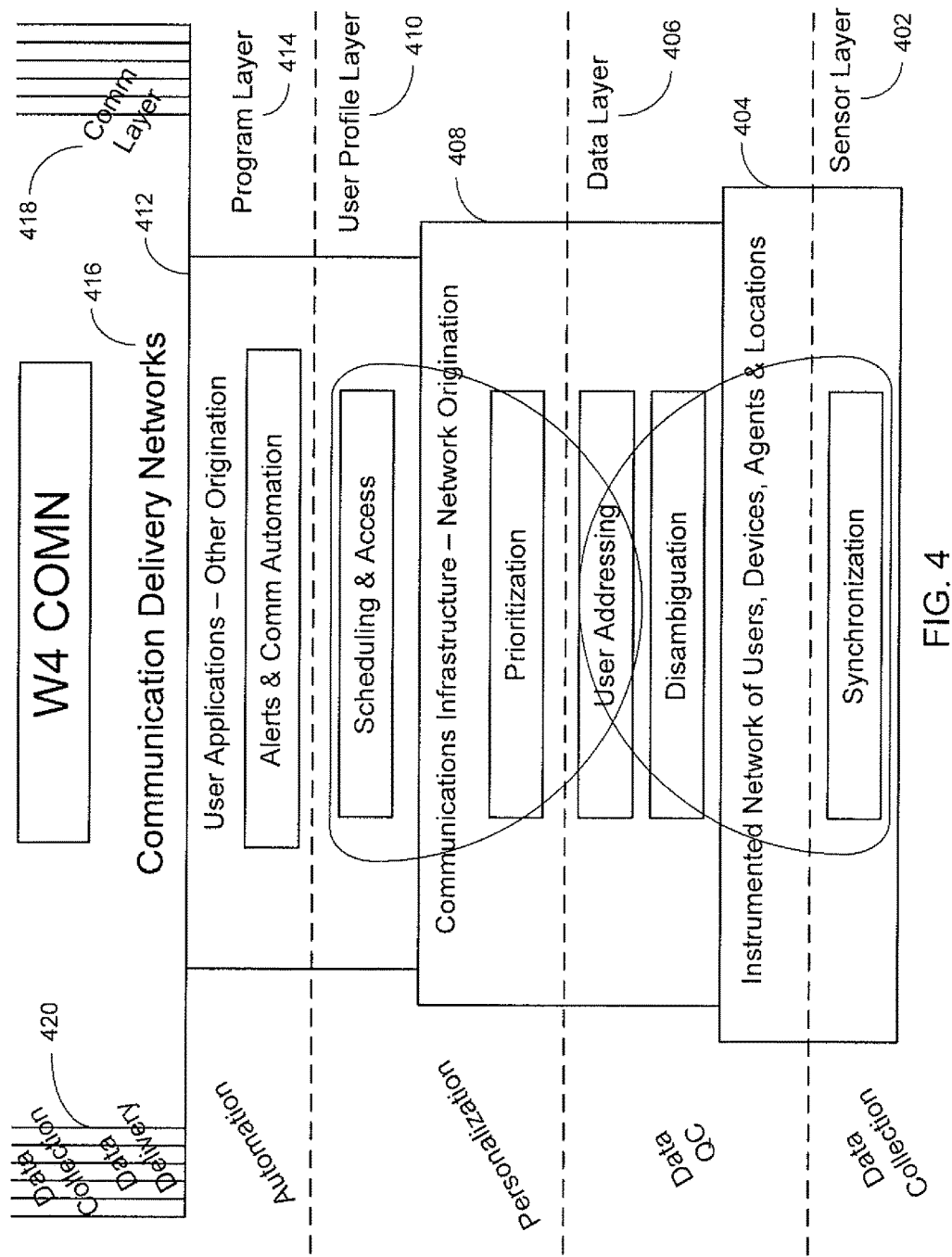
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
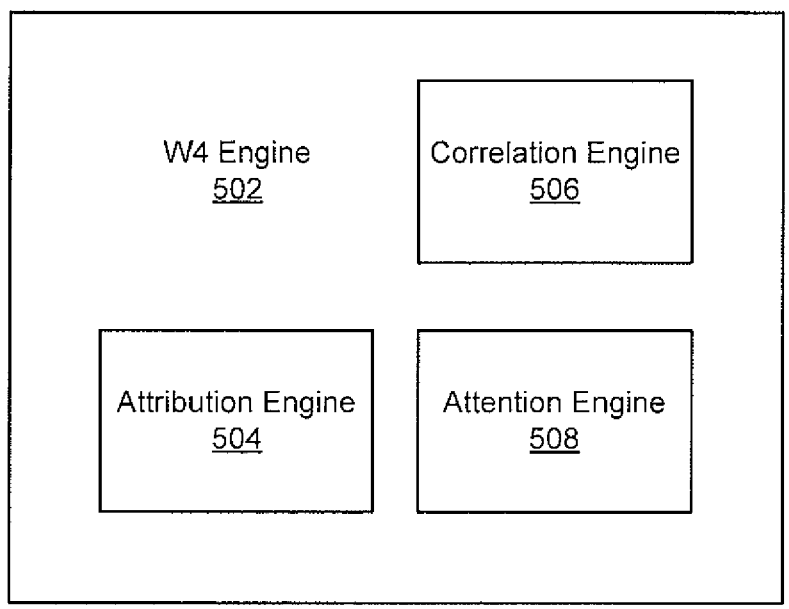
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
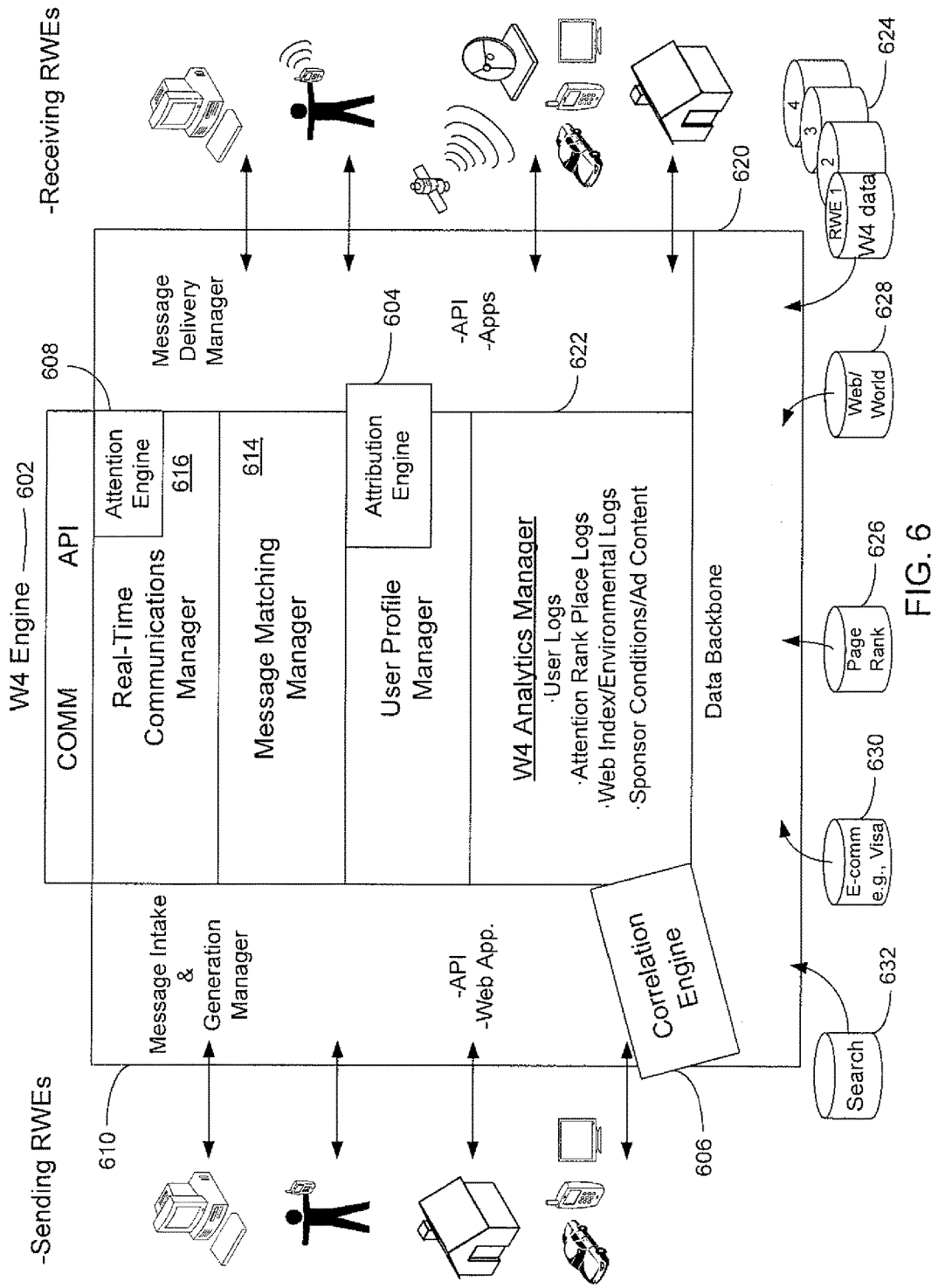
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4 COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail<br>Audio-based communications, such as voice calls, voice notes, voice mail |

TABLE 2-continued

Examples of Interaction Data

| Type of Data | Example(s) |
|---|---|
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Presentation of Media Related to a Context

Media such as music, videos, movies, images, books and publications help define and shape human consciousness. Media may evoke deep seated memories and create a picture, an impression, a feeling, of a time or place, a person or a group of persons, or even an abstract idea. So little is within the compass of direct experience, yet through the lens of recorded media, a person can glimpse a flash of another place or time, may in fact, be able to enter the thoughts of another person. The past and the present, and the far reaches of the world carry on an unbroken dialogue through media.

A person may wish, for any number of reasons, to set sail on the ocean of available media to capture an idea, a place, a time, and to live it, think it, experience it on a conscious or unconscious level. It is simple enough to retrieve a playlist or list of videos for a single musical artist. But a person may wish to capture a more complex concept, for example, a person may wish to create a playlist of songs representing the favorite music of immediate family members when each of the family members were a particular age. In another example, a person may wish to listen to music listened to by surfers in Hawaii in 1974.

More abstractly, when a user is requesting a playlist, the user may be said to have a specific context in mind. In one embodiment, the user's context can be defined as a set of criteria that describe or circumscribe one or more related ideas. The criteria can be conceptually divided into four categories: Who, What, When and Where.

"Who" criteria are persons, devices, or proxies who are related to the ideas embodied in the context. "Who" may be a known person, such as the user or a specific person known by the user. "Who" may also be a list of specific persons, such as the contact list stored on the PDA of a user, or persons listed on a user's social network profile as friends. Alternatively, "Who" can be a general description of persons of interest, such as persons who are interested in surfing.

"What" criteria are objects or topics related to the ideas embodied in the context. "What" may be the form of media the user is interested in, such as music or videos. "What" may be a genre of music or video, such as country or rock. "What" may be subject matter addressed in media, such as love songs or even specific lyrical phrases. Alternatively, "What" may be a mood or atmosphere, such as happy, sad, energetic, or relaxed.

"When" criteria are dates and times which are related to the ideas embodied in the context. "When" may be the current date and time. "When" may also be a specific date and time in the past or the future, or a range of dates and times in the past or the future. "When" may be an offset from a specific date, for example, ten days in the past. Alternatively, "When" can be an event on a calendar, such as a birthday, a season or a holiday, or an event in the news, such as the last time a favorite sports team won a championship.

"Where" criteria are physical locations. "Where" may be a user's current location. "Where" may be specific place, such as a country, a state, a city, a neighborhood. "Where" may be defined as the location of an event, such as a concert or some other newsworthy occurrence. Alternatively, "Where" can be a general description of places of interest, such as blues or jazz clubs.

The embodiments of the present invention discussed below illustrate application of the present invention within a W4 COMN. Nevertheless, it is understood that the invention can be implemented using any networked system that is capable of collecting, storing accessing and/or processing user profile data, as well as temporal, spatial, topical and social data relating to users and their devices. Thus the term W4 COMN is used herein for convenience to describe a system and/or network having the features, functions and/or components described herein throughout.

A W4 COMN can provide a platform that stores media files and enables the selection and presentation of such files related using queries based on complex contexts containing who, what, when, and where criteria, allowing a user to experience or re-experience the media of a specific combination of time, place and social network by mining historical and current W4 data, and combining it with, among other things, charts of popular media at the specific time and place specified.

Figure 7:
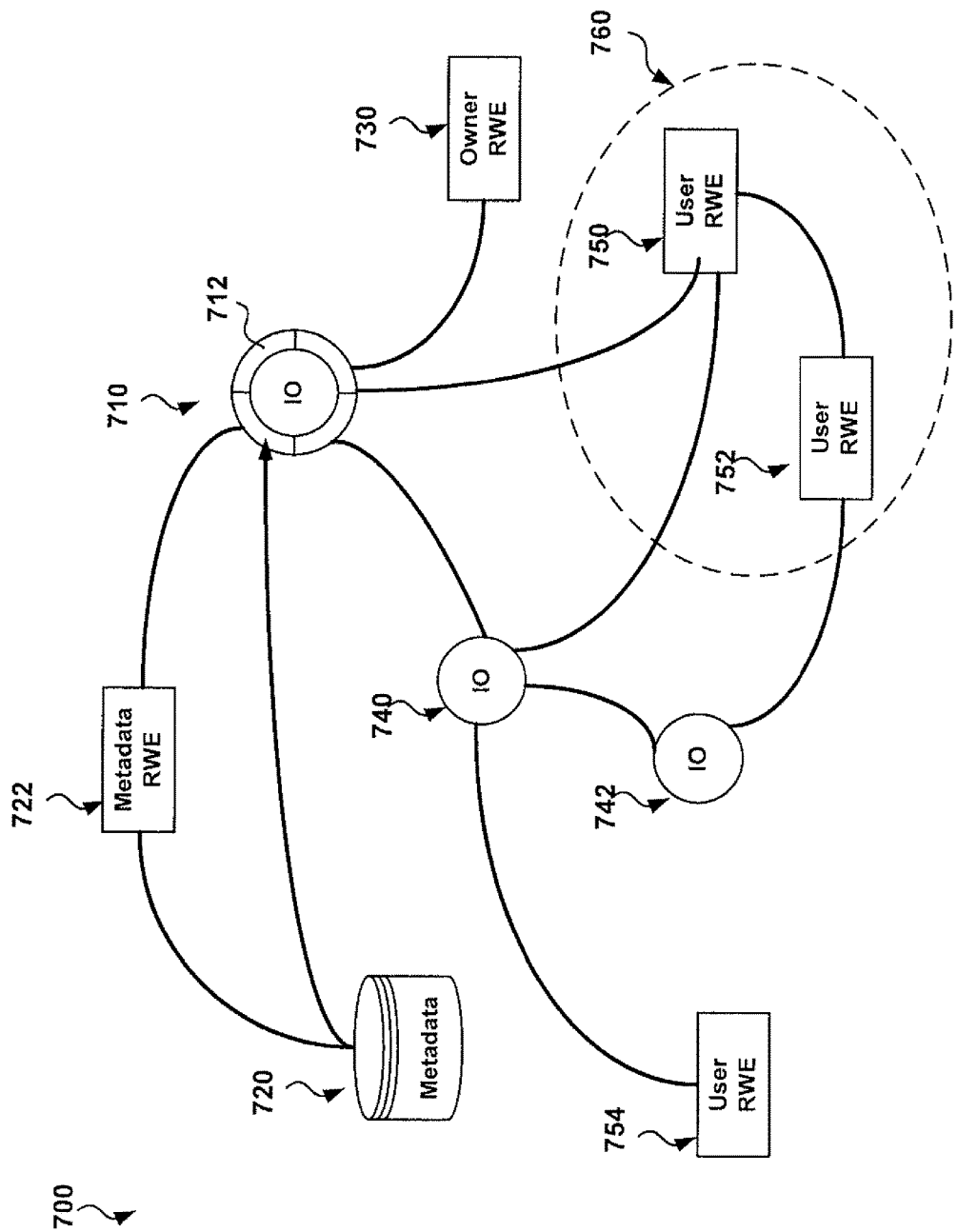
FIG. 7 illustrates one embodiment of a data model showing how a network such as a W4 COMN can store media files and relate such files to RWEs, such as persons and places, and IOs, such as topics and other types of metadata.

FIG. 7 illustrates one embodiment of a data model showing how a W4 COMN can store media files and relate such files to RWEs, such as persons and places, and IOs, such as topics and other types of metadata.

In the illustrated embodiment, media is stored as media objects 710. Media objects are passive IOs relating to media files containing audio content, visual content, or both. Such media files can contain content such as songs, videos, pictures, images, audio messages, phone calls, and so forth. The media objects themselves contain metadata 712. Such data may be specific to the to the object data 710 and unrelated to any other IO or RWE. At the simplest level, such metadata may relate to basic file properties such as creation date, text or an image that is associated with a media file to which an IO relates.

Additionally, there are existing databases 720 which can reside within or outside of the network that can provide an extensive set of descriptive metadata relating to specific songs, videos and other types of media. For example, the Allmusic database (formerly the All Music Guide, owned by All Media Guide) provides metadata which includes:

Basic metadata such as names, genres, credits, copyright information, product numbers.

Descriptive content such as styles, tones, moods, themes, nationalities, etc.

Relational content such as similar artists and albums, influences, etc.

Editorial content such as biographies, reviews, rankings, etc.

Other types of databases that can be used as sources for metadata relating to songs and video include:

Historical billboard rankings at a local, regional, or national level, or on foreign billboards.

Music and video industry news.

Music lyrics.

In one embodiment, metadata originating from such databases can extracted from source databases and embedded 712 in the media objects 710 themselves. Alternatively or additionally, the media objects may be related to IOs that contain or relate to metadata 740. Metadata can include one or more keywords or topics that describe or classify data. For example, a IO relating to metadata can be an topics that relates to all songs within a genre, such as rock, or all songs performed at a specific festival, such as Woodstock. Topic or IOs relating to metadata can be associated with IOs relating to higher level topics 742. For example, a composer may be associated with a topic such as baroque music, which is itself associated with a higher-level IO for classical music.

Alternatively or additionally, a metadata server with its associated databases can be defined as an RWE 722 within the W4 COMN, and media objects and other IOs can be associated with the RWE 722. In one embodiment, metadata relating to a media object can then be retrieved on demand, rather than being stored in static metadata or in a persistent IO. Metadata retrieved on demand can be chosen based on needs of users who have a potential interest in the media object. For example, a user who initially selects a media object based on a topic can then retrieve metadata on demand relating to tone or mood of the music associated with the media object.

If a user wishes to select media objects using a topic for which no topics exists, for example, the top IO hits in the U.K. in 1975, a metadata server which is capable of providing such information can be queried to retrieve a list of such songs. In one embodiment, the list of songs can be used to create an IO relating to a topic, such as IO 740, by associating media objects relating to the list of songs with a newly created IO. In one embodiment, such an IO is created by a correlation engine within a W4 engine (see above and FIGS. 4 through 6, for example). The IO can then be used in subsequent queries.

In one embodiment, media objects are associated with other RWEs, such as musical rights holders 730 (i.e. owners and licensees), and interested listeners 750. In one embodiment, where an owner 730 of a media object can be identified, an attribution engine within a W4 engine tracks the real-world ownership, control, publishing or other conditional rights of any RWE in any media IO whenever a new object is detected.

In one embodiment, users 750, 752, and 754 can be identified as having an interest in a specific song 710 or a topic IO 740 or 742 by a correlation engine within a W4 engine. In one embodiment, the correlation engine identifies relationships between user RWEs and media or IOs relating to metadata by creating a combined graph of the RWEs and IOs and their attributes, relationships and reputations. For example, a user can explicitly state in a user profile that they have an interest in a specific musical artist. Alternatively, the correlation engine can determine a user's interest in a topic or a song or view based on the content of the user's interaction data, sensing attention events from any internal or external source.

In one embodiment, the W4 COMN builds a profile of a user over time by collecting data from the user or from information sources available to the network so as to gain an understanding of where they were born, where they have lived, and where they live today. Using social data, the W4 COMN can also create an overlapping social network profile which places the user in a temporal, geographic and social graph, thus determining where a user lived when and with whom. User RWEs can be also be associated with other RWEs through interaction data. Users who are interested in the same time/place can declare their interests and be connected to a topic based social network through, for example, an IO relating to a topic. In the illustrated embodiment in FIG. 7, users 750 and 752 are identified as being within a social network, 760.

Thus, media objects can be stored and associated with temporal, spatial, social network and topical data derived from, without limitation, traditional metadata sources, user profile data, social networks, and interaction data, building a network of relationships across the universe of media and users. Such relationships may be built on demand, if necessary. Such relationships can then enable queries for media that satisfy the criteria of simple or complex contexts.

Figure 8:
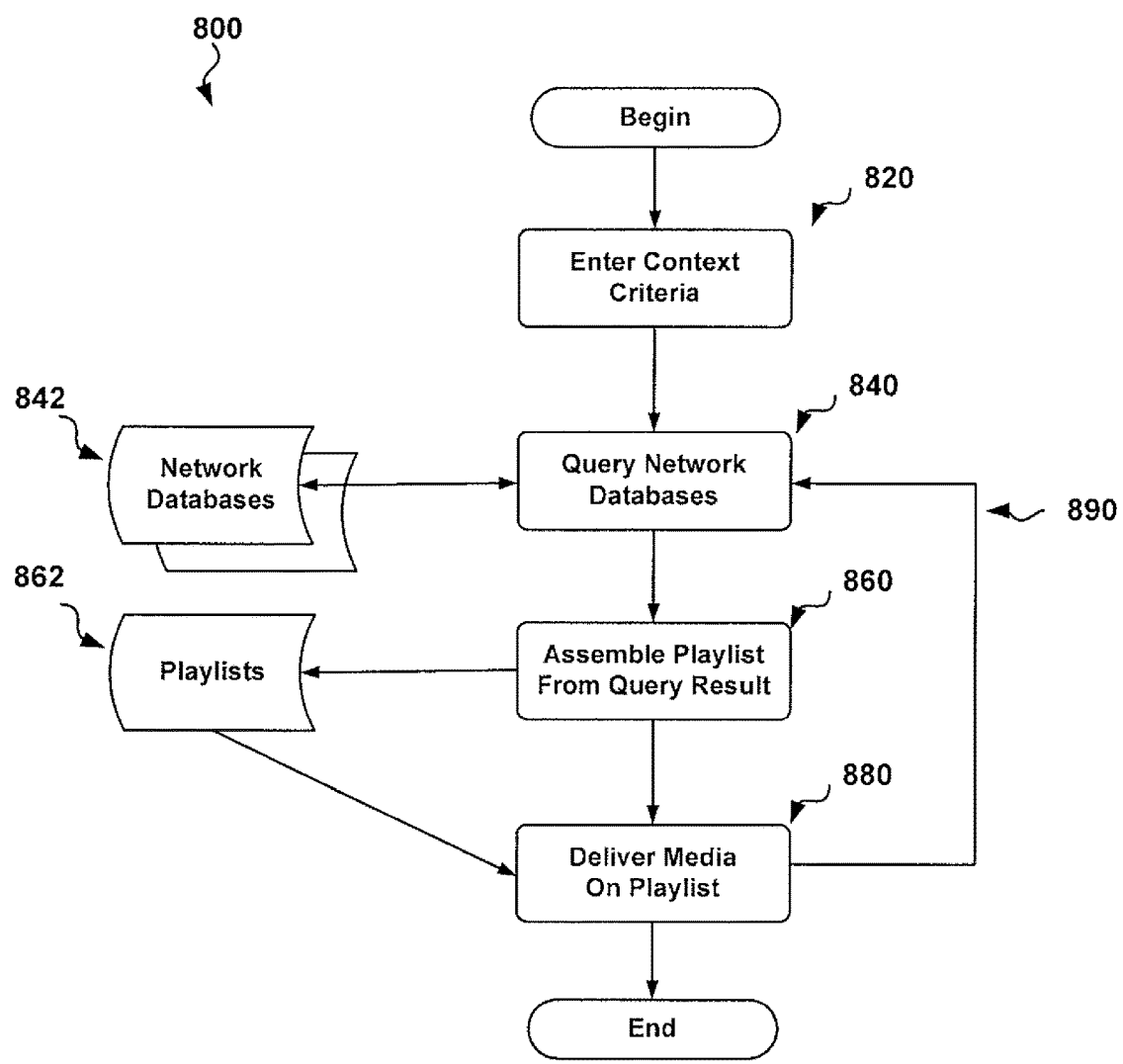
FIG. 8 illustrates one embodiment of a process of how a network containing temporal, spatial, and social network and topical data for a plurality of users, devices, and media, such as a W4 COMN, can be used to enable customized music delivery for complex user contexts having who, where, when, and what criteria.

FIG. 8 illustrates one embodiment of a process 800 of how a network containing temporal, spatial, and social network and topical data for a plurality of users, devices, and media (such as a W4 COMN), can be used to enable customized music delivery for complex user contexts having who, where, when, and what criteria.

The process begins when a user enters a context criteria 820 using a user proxy device such as, for example, a portable media player, PDA, computer, or cell phone. Data relating to the context can be any combination be any who, what, when, or where criteria. In one embodiment, the criteria can be related to one another using standard relational or set operators. In one embodiment, the query can be stated as a natural language query The context is used to formulate a query based on the context criteria so as to search, via the network, for user profile data, social network data, spatial data, temporal data and topical data that is available via the network 842 and relates to the context and to media files so as to identify at least one media file that is relevant to the context criteria.

In one embodiment, the criteria are interpreted to take advantage the best available data within the network. A context may be defined in general terms, but the proper data and access paths may not be apparent to an end user. For example, assume a user enters a query "Play the favorite music of surfers in Hawaii in 1974."

One interpretation of such a query would be to retrieve songs in the genre "surf music", released in 1974 whose lyrics reference Hawaii. Such an interpretation may be appropriate if the network has data limited to music metadata, but does not fully address the query-surfers in Hawaii 1974 might have liked blues or jazz. The requesting user may, be unaware of, or may not fully appreciate that, the network stores data for a large number of other users. A subset of such users may be users whose hobby is surfing and who lived in Hawaii in 1974.

The query could search for users known to the network whose profile or interaction data indicate have surfing as a hobby or interest and who lived in Hawaii in 1974. The musical preferences of such users, such as musical genre, favorite artists, or favorite songs could then be used to search for media objects for songs relating to such genre, artists, or songs and which were released in 1974.

The query results are then used to assemble a playlist 860 that, in certain embodiments, can be stored on a computer readable medium 862 referencing one or more media objects or files relevant to the context. The playlist 862 is then used to download, stream, or otherwise deliver media 880 on the playlist to one or more user devices associated with the requesting user In one embodiment, a query may be recursively executed 890 and the results delivered based on a trigger condition, for example, if the physical location of the end user changes or if the user arrives at a predetermined location, or at a specific time of day or day of the week.

Figure 9:
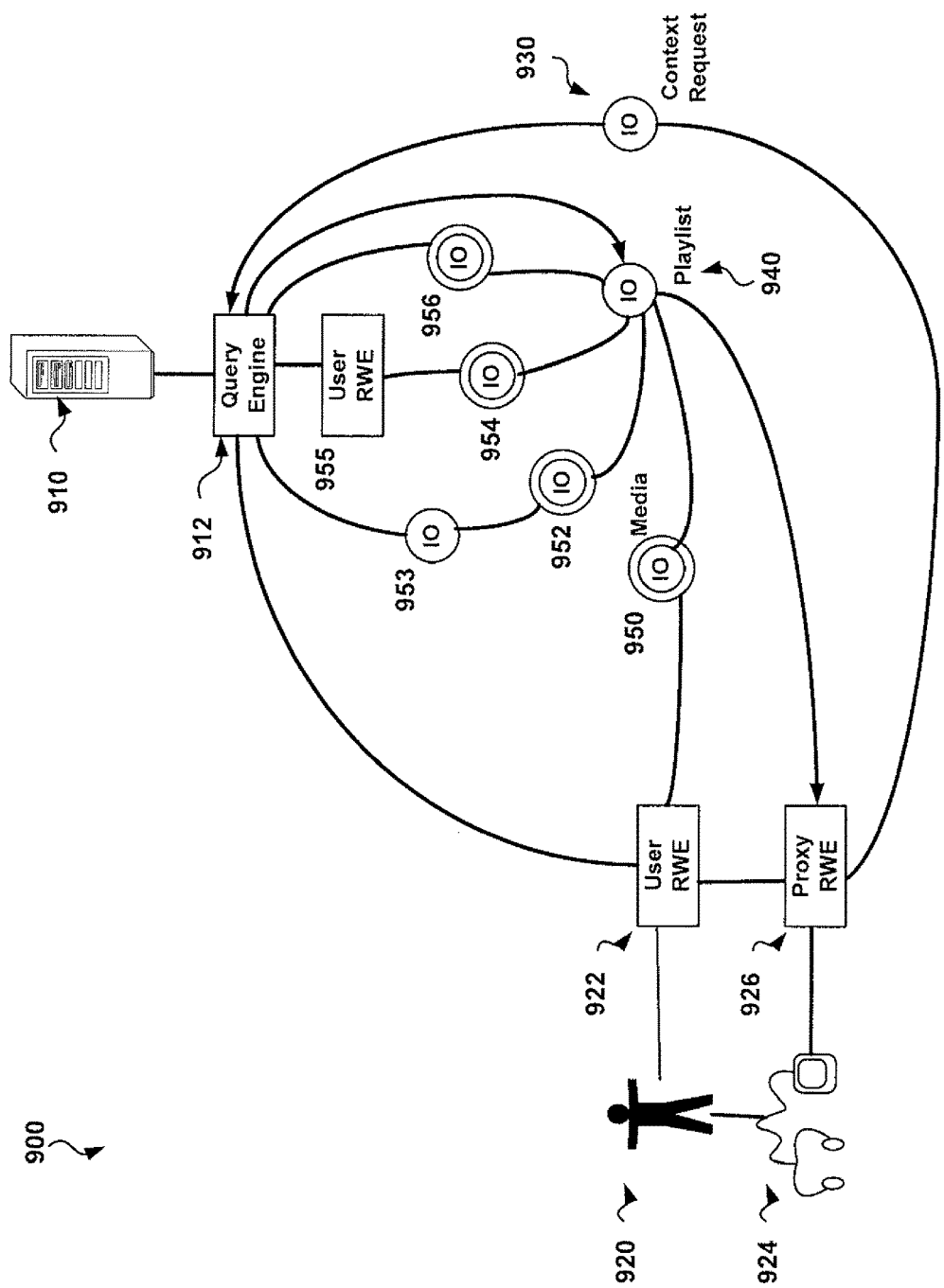
FIG. 9 further illustrates how the process illustrated in FIG. 8 can be supported by one embodiment of a W4 COMN or other network providing similar data and processing capabilities.
Figure 10:
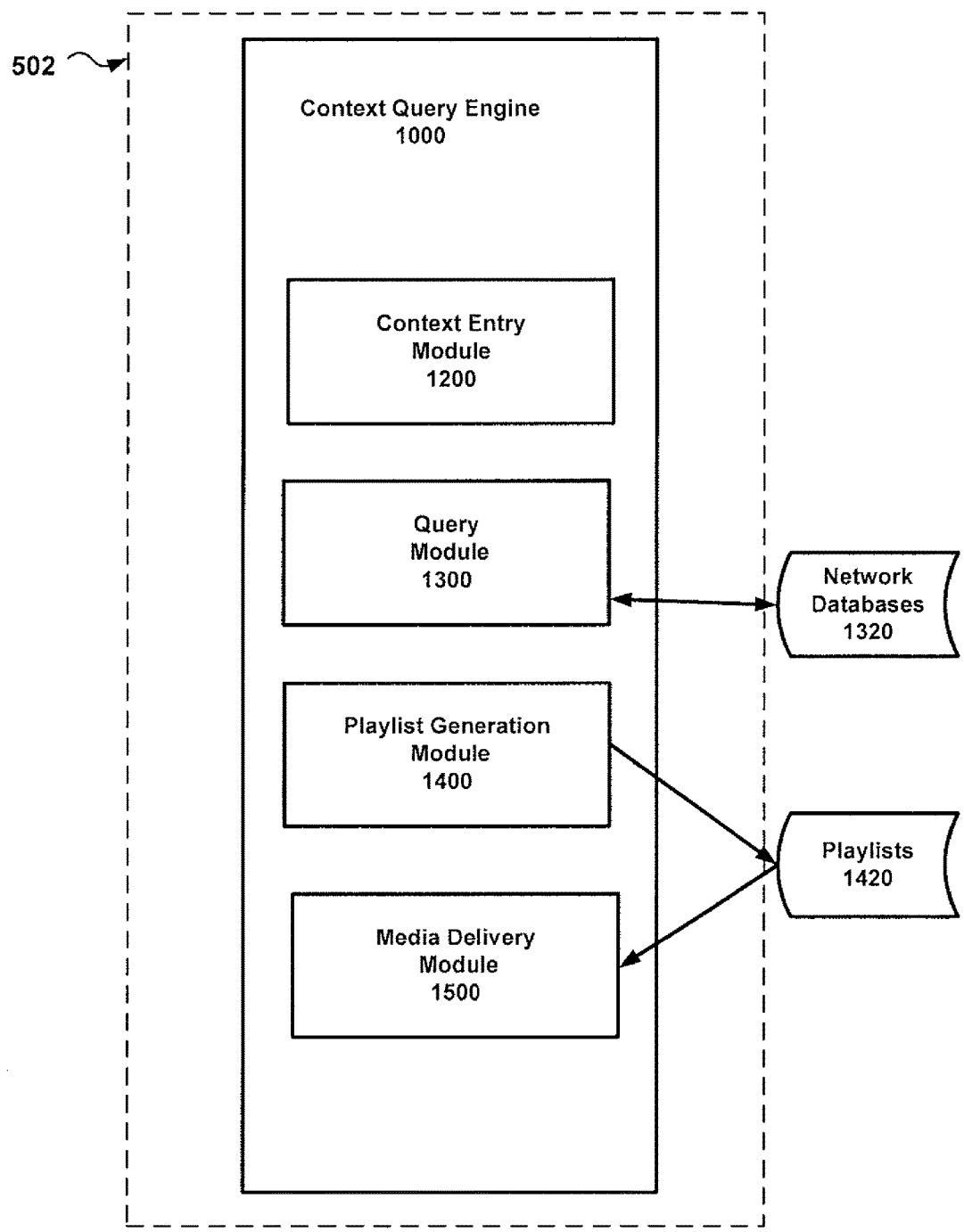
FIG. 10 illustrates the components of one embodiment of a context query engine.

FIG. 9 further illustrates how the process illustrated in FIG. 8 can be supported by one embodiment of a W4 COMN or other network providing similar data and processing capabilities.

A context query engine 912 resides on a server 910 within the W4 COMN. The context query engine 912 can be defined to the W4 COMN as an RWE, or alternatively, an active IO. The context query engine can be a component of a W4 engine, or, alternatively, may use services provided by components of a W4 engine or any of its constituent engines.

The context query engine 912 provides a user interface on a user's portable media player 924 (known to the network as a user proxy RWE 926) or other media capable device or application, that enables a user 920 (known to the network as an RWE 922) to enter a context. The end user device 924 may contain positioning or other sensors that detect various aspects of the physical environment surrounding the user 920, such as, for example, the user's geographical location. Sensors can also include other environmental sensors such as temperature and lighting sensors, or can also include biometric sensors. Sensed data can be included in the context automatically, or some or all can be included by explicit user selection or by system selection.

The context query engine 912 can use the context data entered on the media player 924 to create an IO 930 relating to the context data owned by the proxy RWE 926 associated with the media player 924. The IO 930 may alternatively or additionally be owned by the user RWE 922. The IO 930 is input to the context query engine 912 which searches the W4 COMN databases and assembles a playlist IO 940 which references media objects 950, 952, 954, and 956 which the context query engine has identified as relevant to the query IO 930.

The context query engine 912 can identify media objects of interest using relationships existing in the W4 COMN databases. Examples include: media 950 directly related to the user RWE 922 (e.g. a user's favorite song); media 952 related to a IO relating to a topic 945; media 945 related to another user 955; and media 956 identified based on metadata embedded within the media object. In one embodiment, such relationships between entities and data objects are stored in a global index within the W4 COMN databases and the context query engine 912 uses the global index to identify media objects of interest.

The user's 920 media player 922, or a software application provided by the media player can use the playlist 930 to request delivery of the media in the playlist to the media player from, for example, a media server or media provider or streaming media server (not shown). Alternatively, the query engine can send the playlist directly to a media server or media provider or streaming media server for delivery of the media to the user's 920 media player 922.

FIG. IO illustrates the components of one embodiment of a context query engine 1000. In one embodiment, the context query engine is a component of a W4 engine 502 within a W4 COMN, such as the context query engine 912 shown in FIG. 9. In alternative embodiments, the context query engine 1000 is a standalone application that has access to one or more databases containing temporal, spatial, social network and topical data relating to one or more users.

The context query engine 1000 includes: a context entry module 1200 that provides a user interface for entry of criteria for contexts; a query module 1300 that searches network databases 1320 for media related to context criteria; a playlist generation module 1400 that generates playlists 1420 using the search results produced by the query module 1300; and a media delivery module 1500 that delivers the media referenced in the playlist to a device associated with the requesting user. Any of the aforementioned modules or the communications between modules (e.g. the playlist or the query) may be stored on computer readable media, for transient, temporary or permanent stage.

The interface provided by the context a context entry module 1200 may be a graphical user interface displayable on computers or PDAs, including HTTP documents accessible over the Internet. Such an interfaces may also take other forms, including text files, such as emails, and APIs usable by software applications located on computing devices.

In one embodiment, the criteria can be related to one another using standard relational or set operators. In one embodiment, temporal and spatial data obtained from sensors within user devices can be included in the context criteria. For example, the current location of a device associated with a user can be automatically identified and included in the context. The user creating the context can be automatically identified through the association of the proxy device with a user within the network and automatically included in the context.

In one embodiment, the context can further specify that the context be processed at a future point in time, periodically, or on the occurrence of a specific event. For example, a context may specify that the context be reprocessed on the occurrence of a trigger condition, such as hourly, when the physical location of a user associated with the context changes, when a calendared event occurs (e.g. an anniversary), or when a news event occurs (e.g. a favorite sports team wins a game.)

In one embodiment, a context can be associated with an advertisement. When a user views an advertisement, a context is entered and processed to generate a playlist which relates to the context, such as a specific era or other topic, and which may further take into account the user's temporal, spatial, social, and topical associations. Thus, an advertisement may supplement basic ad content with media tailored for a specific user. For example, an advertisement for a sports car may be associated with a context specifying the users favorite musical artist and songs with a fast tempo or explicit references to speed, or the year 1975 when the user last owned a sports car.

The query module 1300 searches one or more network databases 1320, for user profile data, social network data, spatial data, temporal data and topical data that is available via the network and relates to the context and to media files so as to identify at least one media file that is relevant to the context criteria. Such searches are performed using the capabilities of the network databases 1320 and their supporting infrastructure.

The query module can, without limitation, parse query terms, identify entities and attributes of entities within the query and further identify relationships between entities and their attributes, as well as relationships to fixed data, such as times, places, and events. Entities and attributes within the query can then be cross referenced against the network databases for correspondence to entities, objects, and attributes within the network database.

In one embodiment, the criteria are interpreted to take advantage the best available data within the network. For example, if data relevant to the context resides on a relational database, the query module can execute a series of SQL statements for retrieving data from a relational database or a procedural language containing embedded SQL. Queries may be nested or otherwise constructed to retrieve data from one set of entities, and to use the result set to drive additional queries against other entities, or to use recursive data retrieval.

In the case of a W4 COMN, the context request can be stored as an IO. Such an IO may itself be comprised of a cluster of linked IOs relating to topics, each IO relating to one or more context criteria. In one embodiment, the query module is a component of a correlation engine of a W4 engine. An IO relating to a context request can be mapped and represented against all other known entities and data objects in order to create both a micro graph for every entity as well as a global graph that relates all known entities with one another, and media objects relevant to the context are thereby identified. In one embodiment, such relationships between entities and data objects are stored in a global index within the W4 COMN.

Where query criteria relate to simple descriptive matter, such as date and time of creation, relationships can be identified using metadata embedded in media objects. Where criteria relate to a topic, such as a genre of music, relationships can be identified through IOs (whether currently existing or dynamically generated) relating to the topic which may then be used to identify media objects associated with the topic.

Where criteria relate to relationships between two or more IOs or RWEs, such as all friends of a particular user, related IOs and RWEs can be identified using social network relationships supported by the W4 COMN. When a specific media object is selected, the media search module can further determine if the user or a user proxy creating the context is permitted to access the content of the media file using ownership data in or associated with the media object.

Specific Examples of Contexts

The disclosure will now discuss specific examples of the above principles. The examples given below are intended to be illustrative, and not limiting.

In one example, if a user wished to listen to Motown music of 1967, the user could enter a context into their media player specifying Motown, music, and 1967. The query engine could search for IOs relating to a topics related to Motown and select media objects associated with that IO where metadata within related media objects indicates the music was released in 1967. The system would also search for metadata within media objects for "Motown" and "1967." The resulting playlist would enable the user to listen to Motown music from 1967.

In another example, if a user loves Manhattan, in one embodiment, the user could enter a context into their media player specifying music and Manhattan. The query engine could search a lyric database, which in one embodiment is defined to the W4 COMN as a RWE, for music which portrays New York in a positive light. Additionally or alternatively the query engine could search for an IO associated with "Manhattan" and select media objects associated with that IO. If no such IO was present, the system could search for metadata within media objects for "Manhattan."

In another example, if a user wished to experience "the summer of love" in San Francisco, in one embodiment, the user could enter a context into their media player specifying, for example, either "summer of love" or a date range (the summer of 1967) and a location (San Francisco). If the "summer of love" was entered, the W4 query engine could search for an IO related to that topics and select media objects associated with that IO. If no such IO was present, the system could search for metadata within media objects for "summer of love." If a date range and location was entered, W4 query engine could search metadata within media objects for "San Francisco" and a date within the specified range. The resulting playlist would contain music, videos or both that would enable the requester to experience the media of the "summer of love" as if they were actually experiencing that era.

In another example, if a user is originally from New York City, and now wishes to listen to the music that was playing during their senior prom, the user would create a context for a year and a place and, possibly a genre, such as popular music, using a W4 interface, for example, a W4 URL. The query engine would search W4 databases for media objects related that time and place. For example, the query engine could search for publications that publish record charts such as Billboard magazine, or other song or album charting or rating services, e.g. Sound Scan from the Nielson Company for the top 40 songs at the time of the user's prom and then locate media objects corresponding to those songs. The user can then listen to the music that would probably have been played at their senior prom.

In another example, if a user then wishes to re-experience his college days in Los Angeles, the user would create a context specifying his college, a specific year and the group of friends he socialized with at that time. The query engine could determine from profile, social networking, and interaction data for the user and for any of his friends who are known to the W4 COMN what kind of music they listen to, who their favorite artists are, and what their favorite songs are. The query engine could then search, for example, using IOs relating to topics and metadata within media objects for songs by favorite artists for the user and his friends that were released that specific year. The query engine could further search, for example, metadata within media objects for references to the user's college, for Los Angeles, or any of his friends. The resulting playlist would contain music, videos or both that would enable the requester to experience the media of his college days.

In another example, if a user wished to listen to the favorite music of surfers in Hawaii in 1974, the user would create a context specifying surfing, Hawaii, and 1974. The query engine could search for users known to the W4 COMN whose profile or interaction data indicate have surfing as a hobby or interest and who lived in Hawaii in 1974. The musical preferences of such users, such as musical genre, favorite artists, or favorite songs could then be used to search IOs relating to such topics or metadata within media objects for songs relating to such genre, artists, or songs which were released in 1974. The resulting playlist would allow the user to experience listen to the music that was probably the favorite music of surfers in Hawaii in 1974.

In another example, if a user wishes to listen to the favorite music of persons who attended (or are attending) a specific concert, the user would create a context specifying the name, date, and time of the concert and specifying persons who attended the concert. The query engine could search the W4 COMN for users whose interaction data indicates they attended the concert. The musical preferences of such users, such as musical genre, favorite artists, or favorite songs could then be used to search IOs relating to such topics or metadata within media objects for songs relating to such genre, artists, or songs. The resulting playlist would contain music, videos or both that would enable the requester to sample music preferred by persons who attended a specific concert.

In another example, if a user wishes to create family playlist of the favorite songs for his family relating to when each of his family members was 11 years old, the user would create a context specifying his family, favorite songs, and age 11. The query engine could then search the users profile and interaction data to determine who his immediate family members are. The query engine would then determine if the users family members are known to the W4 COMN and determine the birthday and musical preferences of such users, such as musical genre, favorite artists, or favorite songs. Such preferences could then be used to search IOs relating to topics or metadata within media objects for songs relating to such genre, artists, or songs which fall in a year in which a specific family member was age 11. The resulting playlist would allow the user to experience the favorite music of his immediate family when they were children.

Real time location data from a users device can also be used to enhance the user experience. For example, assume a user is currently walking through the Haight Ashbury district of San Francisco with a media player whose physical location can be sensed. The user could enter a context specifying a specific year and the user's current location. The query engine could then search W4 databases, for example, using object metadata or IOs relating to such topics, for music released in the selected year and relating to (e.g. written or produced in or performed by artists that reside in or resided in) Haight Ashbury or San Francisco and a playlist relating to that time and place is created. As the user walks from one area of the city to another, the users device detects the change in location and changes the context to reflect the user's new location. The new context is then use to create a new playlist and a different set of music plays that relates to the user's current location. As the user leaves the area and walks or otherwise travels further, the playlist of music may change again to relate to the new location.

In an example illustrating the use of the context in an advertisement, advertisers can create ads for modern day products whose music comes from another era. For example, an ad for Viagra could be associated with a context whose criteria includes 1958, popular music, and energetic music. Such an ad could also be tailored to a user, for example, a context could be defined containing criteria including the current user, the year the user was 18, and the user's favorite music.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    generating a database that stores associations between each of a plurality of media objects and temporal, social, or topical data, wherein the database includes relationships between specific media objects and metadata sources associated with a specific media object, user profile data, social network data and interaction data;
    receiving a request, from a requesting device associated with a user, for media;
    parsing the request to identify at least two of social criteria, topical criteria, or temporal criteria included in the request, the social criteria describing one or more people or types of people associated with the requested media, the topical criteria describing one or more topics associated with the requested media, and the temporal criteria describing a past time period associated with the requested media;
    when the request includes social criteria, determining media associated with the one or more people or types of people defined by the social criteria based on the association;
    when the request includes topical criteria, identifying topics associated with the request and determining media associated with the identified topics based on the association;
    when the request includes temporal criteria, identifying a time associated with the request and determining media associated with the identified time based on the association;
    locating a plurality of media files that each match the at least two of social criteria, topical criteria, or temporal criteria included in the request based on the determined media associated with the one or more people or types of people, media associated with the identified topics, or media associated with the identified time; and
    transmitting the plurality of media files over the network to the requesting device.

2. The method of claim 1 wherein the social criteria comprise criteria that match a plurality of users within a social network, and the preferences of the plurality of users are used when determining media associated with the one or more people or types of people defined by the social criteria.

3. The method of claim 1 wherein the request for media related to a context has a trigger condition and the request is not processed until the trigger condition occurs.

4. The method of claim 3 wherein the trigger condition is selected from the group consisting of a time, a date, a calendar event, the presence of the requesting device in a physical location, display of an advertisement on the requesting device, selection of an advertisement on the requesting device.

5. The method of claim 1 wherein the request is transmitted from the requesting device when an advertisement is displayed or selected on the requesting device.

6. A system comprising:
a processor;
a storage medium for tangibly storing thereon program logic for execution by the processor, the program logic comprising:
logic executed by the processor for generating a database that stores associations between each of a plurality of media objects and temporal, spatial, social network or topical data, wherein the database includes relationships between specific media objects and metadata sources associated with a specific media object, user profile data, social network data or interaction data;
logic executed by the processor for receiving a request from a requesting device associated with a user for media;
logic executed by the processor for parsing the request to identify at least two of social criteria, topical criteria, or temporal criteria included in the request, the social criteria describing one or more people or types of people associated with the requested media, the topical criteria describing one or more topics associated with the requested media, and the temporal criteria describing a past time period associated with the requested media;
logic executed by the processor for determining, when the request includes social criteria, media associated with the one or more people or types of people defined by the social criteria based on the association;
logic executed by the processor for identifying, when the request includes topical criteria, topics associated with the request and determining media associated with the identified topics based on the association;
logic executed by the processor for identifying, when the request includes temporal criteria, a time associated with the request and determining media associated with the identified time based on the association;
logic executed by the processor for locating a plurality of media files that each match the at least two of social criteria, topical criteria, or temporal criteria included in the request based on the determined media associated with the one or more people or types of people, media associated with the identified topics, or media associated with the identified time; and
logic executed by the processor for transmitting the plurality of media files on the playlist over the network to the requesting device.

7. The system of claim 6 wherein the social criteria comprise criteria that match a plurality of users within a social network, and the preferences of the plurality of users are used when determining media associated with the one or more people or types of people defined by the social criteria.

8. The system of claim 6 wherein the request for media related to a context has a trigger condition and the request is not processed until the trigger condition occurs, wherein the trigger condition is selected from the list: a time, a date, a calendar event, the presence of the requesting device in a physical location, display of an advertisement on the requesting device, selection of an advertisement on the requesting device.

9. The system of claim 6 wherein the request is transmitted from the requesting device when an advertisement is displayed or selected on the requesting device.

10. A non-transitory computer-readable storage medium tangibly encoded with computer-executable instructions, that when executed by a computing device, perform a method comprising:
generating a database that stores associations between each of a plurality of media objects and temporal, social or topical data including, wherein the database includes relationships between specific media objects and metadata sources associated with a specific media object, user profile data, social network data and interaction data;
receiving a request, from a requesting device associated with a user, for media;
parsing the request to identify at least two of social criteria, topical criteria, or temporal criteria included in the request, the social criteria describing one or more people or types of people associated with the requested media, the topical criteria describing one or more topics associated with the requested media, and the temporal criteria describing a past time period associated with the requested media;
when the request includes social criteria, determining media associated with the one or more people or types of people defined by the social criteria based on the association;
when the request includes topical criteria, identifying topics associated with the request and determining media associated with the identified topics based on the association;
when the request includes temporal criteria, identifying a time associated with the request and determining media associated with the identified time based on the association;
locating a plurality of media files that each match the at least two of social criteria, topical criteria, or temporal criteria included in the request based on the determined media associated with the one or more people or types of people, media associated with the identified topics, or media associated with the identified time; and
transmitting the plurality of media files over the network to the requesting device.

11. The non-transitory computer-readable storage medium of claim 10 wherein the social criteria comprise criteria that match a plurality of users within a social network, and the preferences of the plurality of users are used when determining media associated with the one or more people or types of people defined by the social criteria.

12. The non-transitory computer-readable storage medium of claim 10 wherein the request for media related to a context has a trigger condition and the request is not processed until the trigger condition occurs, wherein the trigger condition is selected from the group consisting of a time, a date, a calendar event, the presence of the requesting device in a physical location, display of an advertisement on the requesting device, selection of an advertisement on the requesting device.

13. The non-transitory computer-readable storage medium of claim 10 wherein the request is transmitted from the requesting device when an advertisement is displayed or selected on the requesting device.

* * * * *